(12) United States Patent
Flemm (10) Patent No.: US 6,996,960 B1
(45) Date of Patent: Feb. 14, 2006

(54) GRASS TRIMMING DEVICE WITH DUAL LINEHEAD SPOOL HUBS

(76) Inventor: William J. Flemm, 330 Merriman Rd., Akron, OH (US) 44303-1500

( * ) Notice: Subject to any disclaimer, the term of this patent is extended or adjusted under 35 U.S.C. 154(b) by 0 days.

(21) Appl. No.: 10/987,880

(22) Filed: Nov. 15, 2004

(51) Int. Cl.
  *A01D 101/00* (2006.01)
(52) U.S. Cl. .......................... 56/12.7; 30/276
(58) Field of Classification Search ............... 56/11.9, 56/12.7; 30/276
  See application file for complete search history.

(56) References Cited

U.S. PATENT DOCUMENTS

| | | | |
|---|---|---|---|
| 4,987,681 A * | 1/1991 | Sepke ..................... 30/276 |
| 5,385,005 A | 1/1995 | Ash | |
| 5,479,765 A | 1/1996 | Wall et al. | |
| 5,649,413 A | 7/1997 | Oostendorp | |
| 5,833,009 A | 11/1998 | Rebot | |
| 6,014,812 A * | 1/2000 | Webster ..................... 30/276 |
| 6,185,916 B1 * | 2/2001 | Johnson ..................... 56/12.7 |
| 6,263,975 B1 | 7/2001 | Rosa et al. | |
| 6,301,863 B1 * | 10/2001 | Liebrecht ..................... 56/10.6 |
| 6,427,429 B1 * | 8/2002 | Brabenec ..................... 56/12.7 |
| 6,691,792 B1 | 2/2004 | Keane | |
| 2003/0037933 A1 | 2/2003 | Breneman et al. | |

* cited by examiner

Primary Examiner—Meredith Petravick
(74) Attorney, Agent, or Firm—John D. Gugliotta; P. Jeff Martin (57) ABSTRACT

A grass trimming device with dual linehead spool hubs is provided. The grass trimming device is adapted to simultaneously trim grass at both a substantially horizontal plane and a substantially vertical plane. The device includes actuation switches which also allow linehead spool hubs to be used in an independent manner.

18 Claims, 10 Drawing Sheets

GRASS TRIMMING DEVICE WITH DUAL LINEHEAD SPOOL HUBS

RELATED APPLICATIONS

The present invention was first described in Disclosure Document Number 559,234, filed on Aug. 16, 2004 under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to lawn trimming and edging devices and, more particularly, to a grass trimming device with dual linehead spool hubs.

2. Description of the Related Art

Grass and weed trimming devices commonly referred to as "WEEDEATER" devices are well known. These lawn trimmer devices include a flexible filament line connected to and radially extending from a hub of the trimmer. The hub rotates at a sufficiently high r.p.m. to allow the filament line to cut through grass, weeds, and other vegetative outgrowth. These power trimmers are often provided with a control handle designed in an upright orientation, and is thus optimized for use in a horizontal lawn cutting plane only.

In an effort to utilize such power trimmers for various lawn cutting purposes, consumers have painstakingly attempted to use these devices in rotated, vertical planes, causing inadvertent damage to nearby plants as well as injury to the user from improper use of the device. Alternatively, consumers have succumb to implementing grass shears resulting in a time-consuming, arduous task.

Hence, there is a long felt need for a lawn trimming device which can trim vegetation at multiple planes and eliminate damage to covetable plants as well as prevent personal injury.

A search of the prior art did not disclose any patents that read directly on the claims of the instant invention; however, the following references were considered related.

The following patents disclose various lawn trimming and edging devices:

U.S. Pat. No. 5,649,413, issued in the name of Oostendorp;

U.S. Pat. No. 6,691,792 B2, issued in the name of Keane;

U.S. Pat. No. 5,479,765, issued in the name of Wall et al.;

U.S. Pat. No. 5,385,005, issued in the name of Ash;

U.S. Pat. No. 5,833,009, issued in the name of Rebot; and

U.S. Pat. No. 6,263,975, issued in the name of Rosa et al.

U.S. Patent Application No. 2003/0037933 A1, published in the name of Breneman et al. discloses a combination line trimmer and edging device having a multi-position handle, a roller edge guide with flange concentrically located about the motor shaft, dual-position safety switches and a battery pack.

Accordingly, there exists a need for a grass trimming device having dual linehead spool hubs adapted to simultaneously trim grass at both a substantially horizontal and vertical plane in a manner which is quick, easy, and efficient.

SUMMARY OF THE INVENTION

It is therefore an object of the present invention to provide a grass trimming device adapted to simultaneously trim grass at both a substantially horizontal plane and a substantially vertical plane.

It is a feature of the present invention to provide a grass trimming device having a handle which retains various actuation switches.

It is another object of the present invention to provide dual linehead assemblies adapted to facilitate the simultaneous trimming of grass at a substantially horizontal plane and a substantially vertical plane.

It is another object of the present invention to provide a safety lock switch adapted to simultaneously disenable both linehead assemblies.

It is another object of the present invention to provide a grass trimming device which provides user with the option of using either linehead assembly in an independent manner.

Briefly described according to one embodiment of the present invention, a grass trimming device with dual linehead spool hubs is provided which is adapted to simultaneously trim grass at both a substantially horizontal plane and a substantially vertical plane. The device comprises a handle which retains various actuation switches.

A battery housing is fastened at its upper end to a lower end of handle. The battery housing is formed of two halves coupled together. A battery retainer is integrally formed within the two halves in order to secure a battery in position. A lower end of battery housing is fastened to an upper end of an elongated, rigid, hollow shaft. A lower end of shaft is mounted to an upper, rearward end of a trimmer housing. The trimmer housing is formed of two halves being coupled together.

In order to facilitate the trimming of grass at a substantially horizontal plane, a first retainer is integrally formed within the two halves of trimmer housing in order to secure a motor mounting plate in position. The first retainer resides within an anterior portion of trimmer housing and lies in a horizontal orientation. The motor mounting plate includes a plurality of apertures formed therethrough to facilitate securable mounting of motor thereto. The motor mounting plate is coupled to retainer. The motor includes a motor shaft which extends through a central portal of motor mounting plate. An upper end of a linehead housing coupler is mounted to a lower end of motor shaft.

A first linehead assembly is provided and comprises a linehead housing, a linehead spool, a helical spring, a linehead cover, and a fastener.

Trimming line is wound about the linehead spool, wherein a free end thereof is inserted through a hole formed in a vertical sidewall of linehead housing and extended outward therefrom.

In order to facilitate the trimming of grass at a substantially vertical plane, a second retainer is integrally formed within the two halves of trimmer housing in order to secure a motor mounting plate. The second retainer resides within a posterior portion of trimmer housing and lies in a vertical orientation. The motor mounting plate includes a plurality of apertures formed therethrough to facilitate securable mounting of an additional motor to motor mounting plate. The additional motor is mounted atop motor mounting plate, and wherein additional motor is positioned perpendicular with respect to preceding motor. The motor mounting plate is coupled to second retainer. The motor includes a motor shaft which extends through a central portal of motor mounting plate. An upper end of a linehead housing coupler is mounted to a lower end of motor shaft.

A second linehead assembly is provided and comprises a linehead housing, a linehead spool, a helical spring, a linehead cover, and a fastener. Second linehead assembly is designed, connected, and configured substantially identical to first linehead assembly, and thus functions identically, except for its vertical cutting orientation.

An alternate embodiment of the present invention is provided which comprises a grass trimming device adapted with dual, pivotal linehead spool hubs.

The use of the present invention allows for outgrowth vegetation to be trimmed at both a substantially horizontal and vertical plane in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Referring now to FIGS. 1–6, a grass trimming device with dual linehead spool hubs 10 is shown, according to the present invention, adapted to simultaneously trim grass at both a substantially horizontal plane and a substantially vertical plane. While the present invention discloses two linehead spool hubs, it is envisioned that more than two linehead spool hubs could be incorporated, thus providing a grass trimming device having multiple linehead spool hubs. The grass trimming device with dual linehead spool hubs 10, hereinafter device 10, comprises a handle 20 which retains an on/off switch 22, a first actuation switch 23, a second actuation switch 24, and a safety lock switch 25. Switches 22, 23, 24, and 25 are arranged about the handle 20 in a manner to facilitate quick and easy use by operator. The on/off switch 22 is adapted to energize and de-energize motor 80, 90. The first actuation switch 23 activates operation of a first linehead assembly 100, and the second actuation switch 24 activates operation of a second linehead assembly 150. The safety lock switch 25 functions to simultaneously disenable both the first linehead assembly 100 and the second linehead assembly 150.

Figure 1:
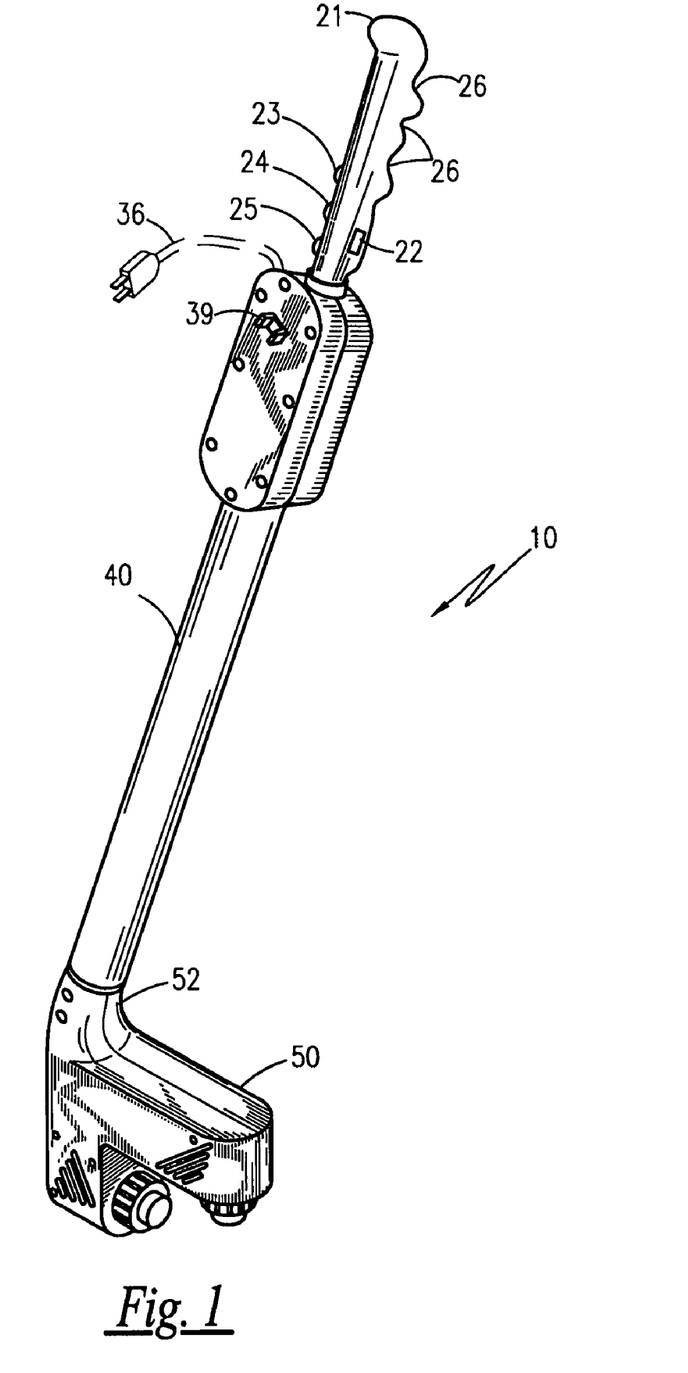
FIG. 1 is a perspective view of a grass trimming device with dual linehead spool hubs, according to the preferred embodiment of the present invention.
Figure 2:
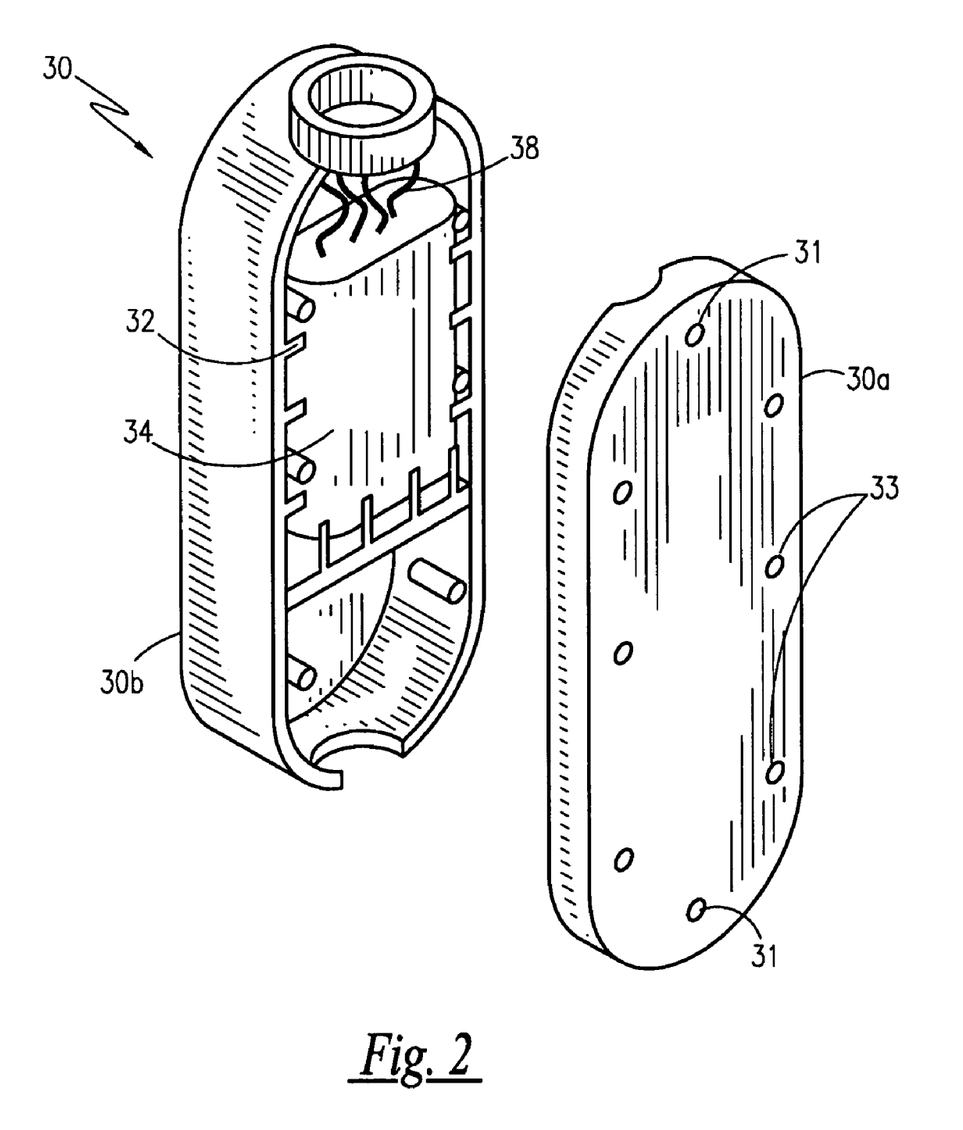
FIG. 2 is an exploded perspective view of the battery housing, according to the preferred embodiment of the present invention.

To facilitate a firm grasp of the device 10, the handle 20 includes an integrally molded palm restraint 21 formed along an upper end thereof, and a series of finger-gripping channels 26 formed along a lower surface of handle 20.

Referring more specifically to FIGS. 1–4, a battery housing 30 is fastened via fasteners 31 at its upper end to a lower end of handle 20. The battery housing 30 is formed of two halves 30a, 30b being coupled together via a coupling means 33. A battery retainer 32 is integrally formed within the two halves 30a, 30b in order to secure a battery 34 in position. A lower end of battery housing 30 is fastened to an upper end of an elongated, rigid, hollow shaft 40 via fasteners 31. Switches 22, 23, 24, 25, battery 34, and motor 80, 90 are electrically connected via connecting wires 38. While a battery 34 is the preferred power source of the device, an electrical outlet is also envisioned, wherein electrical power is harnessed therefrom via a plug 36. A plug clamp 39 is mounted to an external circumferential sidewall of battery housing 30 half 30b in order to retain plug 36 when not in use.

Figure 3:
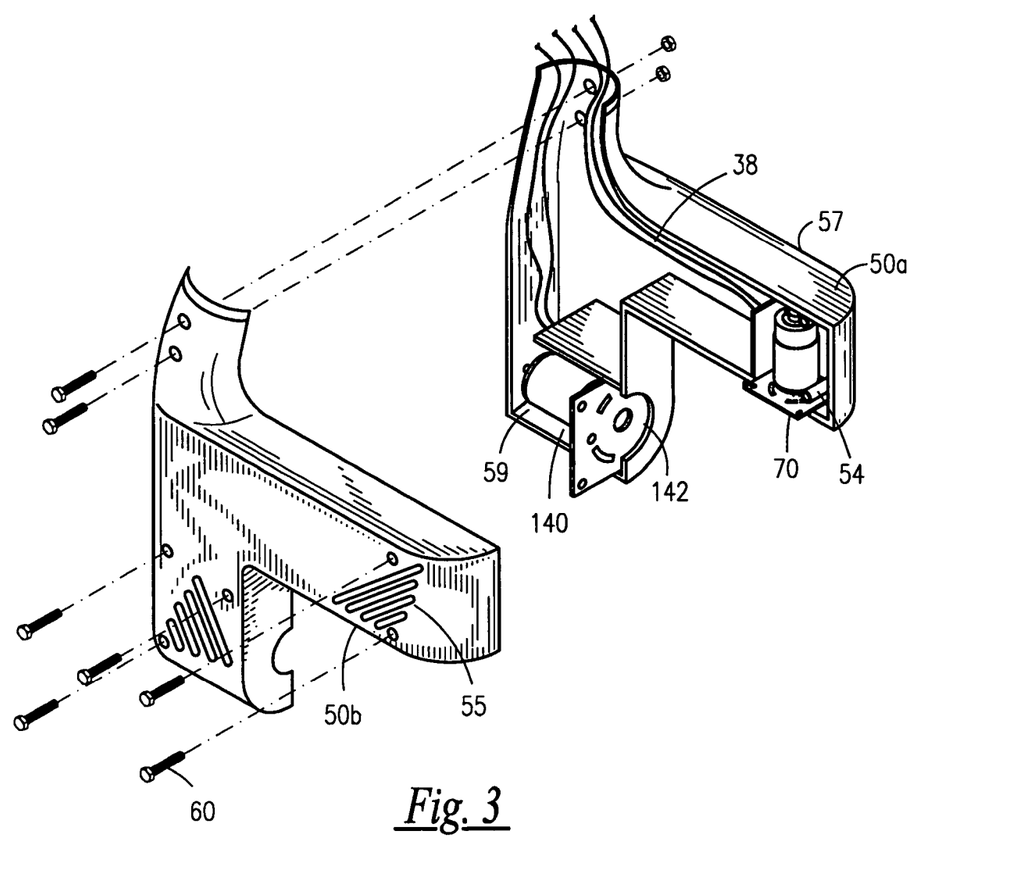
FIG. 3 is an exploded perspective view of the trimmer housing and motor assembly, according to the preferred embodiment of the present invention.

A lower end of shaft 40 is mounted to an upper, rearward end of a trimmer housing 50 at a tubular neck portion 52 thereof. Trimmer housing 50 is formed of two halves 50a, 50b being coupled together via a coupling means 60. A first retainer 54 is integrally formed within the two halves 50a, 50b of trimmer housing 50 in order to secure a motor mounting plate 70 in position. The first retainer 54 resides within an anterior portion 57 of trimmer housing 50 and lies in a horizontal orientation. The two halves 50a, 50b of trimmer housing 50 are each provided with foramens 55 to facilitate cooling of motor 80, 90.

Figure 4:
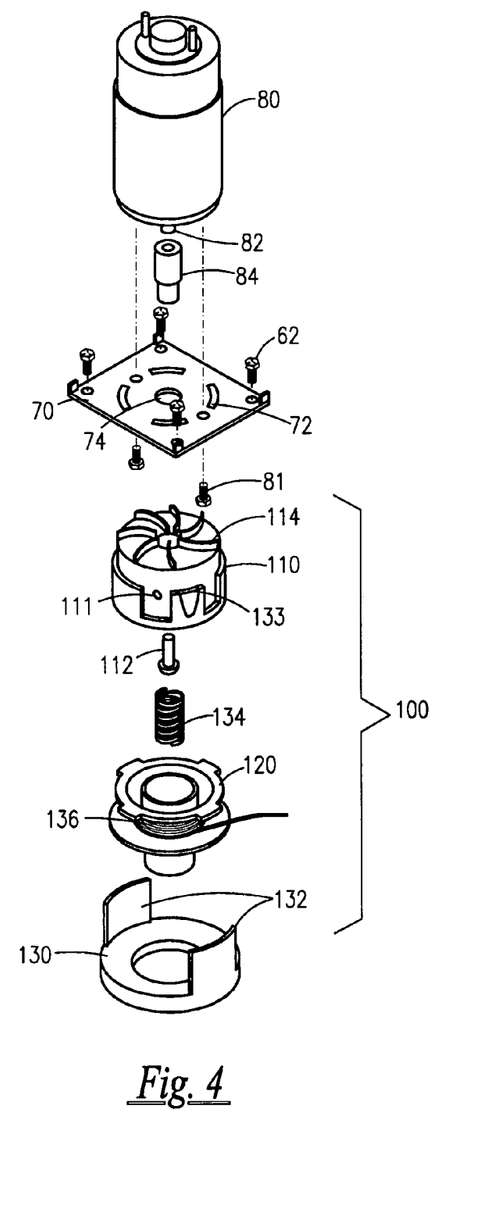
FIG. 4 is an exploded perspective view of the motor, the mounting plate, and the first linehead assembly, according to the preferred embodiment of the present invention.

The motor mounting plate 70 includes a plurality of apertures 72 formed therethrough to facilitate securable mounting of motor 80 to motor mounting plate 70. The motor 80 is mounted atop motor mounting plate 70 via bolts 81, and motor mounting plate 70 is coupled to retainer 54 via a coupling means 62. The motor 80 includes a motor shaft 82 which extends through a central portal 74 of motor mounting plate 70. An upper end of a linehead housing coupler 84 is mounted to a lower end of motor shaft 82.

A first linehead assembly 100 is provided and comprises a linehead housing 110 being positioned at a lower end of linehead housing coupler 84 in an overlying manner, to which linehead housing 110 is secured via a fastener 112. A top side of linehead housing 110 is provided with integrally molded fan blades 114 to facilitate cooling of motor 80. The linehead housing 110 is adapted to house a linehead spool 120 which is held in place between tabs 132 of a linehead cover 130. The tabs 132 project upwardly along an outer periphery of linehead cover 130, at opposed positions there along. The tabs 132 are adapted to engage opposed slots 133 formed in linehead housing 110, thereby fastening linehead cover 130 thereto.

In order to bias the linehead spool 120 against the linehead cover 130, a helical spring 134 is vertically positioned between the linehead spool 120 and the linehead housing 110. Consequently, linehead housing 110, linehead spool 120, helical spring 134, linehead cover 130, and fastener 112 comprise the first linehead assembly 100.

Trimming line 136 is wound about the linehead spool 120, wherein a free end thereof is inserted through a hole 111 formed in a vertical sidewall of linehead housing 110 and extended outward therefrom. Upon actuation of motor 80 via on/off switch 22, and after depression of first actuation switch 23, the linehead assembly 100 rotates, thereby causing trimming line 136 to rotate about an axis of linehead spool 120 in a substantially horizontal plane.

Referring now to FIGS. 1, 3, 5, and 6, in order to facilitate the trimming of grass at a substantially vertical plane, a second retainer 140 is integrally formed within the two halves 50a, 50b of trimmer housing 50 in order to secure a motor mounting plate 142. The second retainer 140 resides within a posterior portion 59 of trimmer housing 50 and lies in a vertical orientation.

Figure 5:
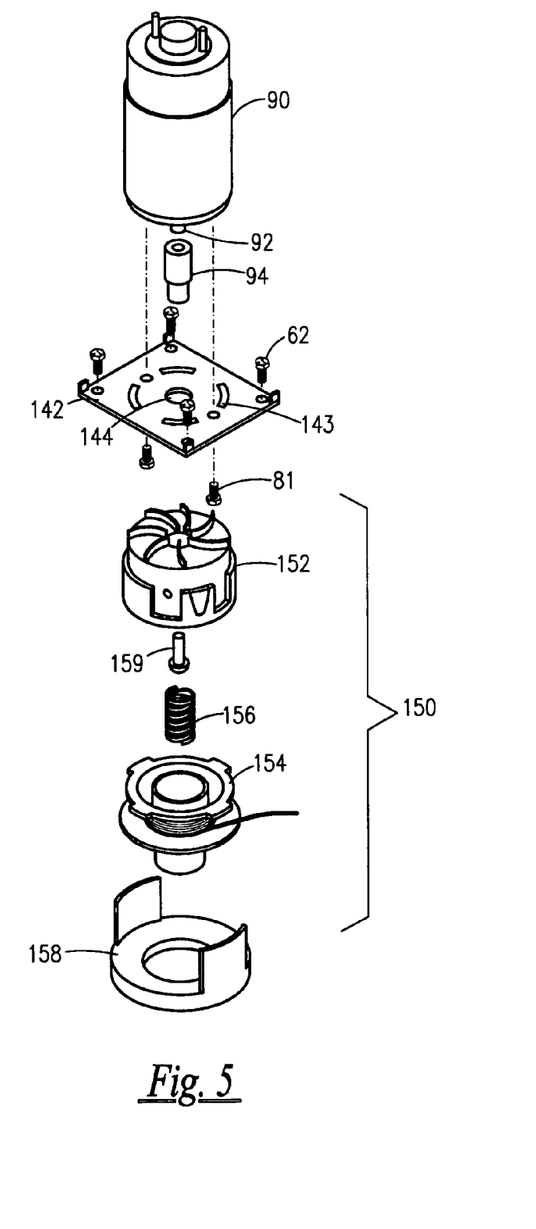
FIG. 5 is an exploded perspective view of an additional motor and mounting plate, and the second linehead assembly, according to the preferred embodiment of the present invention.

Motor mounting plate 142 includes a plurality of apertures 143 formed therethrough to facilitate securable mounting of motor 90 to motor mounting plate 142. The motor 90 is mounted atop motor mounting plate 142 via bolts 81, and wherein motor 90 is positioned perpendicular with respect to motor 80. The motor mounting plate 142 is coupled to second retainer 140 via a coupling means 62. The motor 90 includes a motor shaft 92 which extends through a central portal 144 of motor mounting plate 142. An upper end of a linehead housing coupler 94 is mounted to a lower end of motor shaft 92.

A second linehead assembly 150 is provided and comprises a linehead housing 152, a linehead spool 154, a helical spring 156, a linehead cover 158, and a fastener 159. Linehead assembly 150 is designed, connected, and configured substantially identical to first linehead assembly 100, and thus functions identically, except for its vertical cutting orientation.

Figure 6:
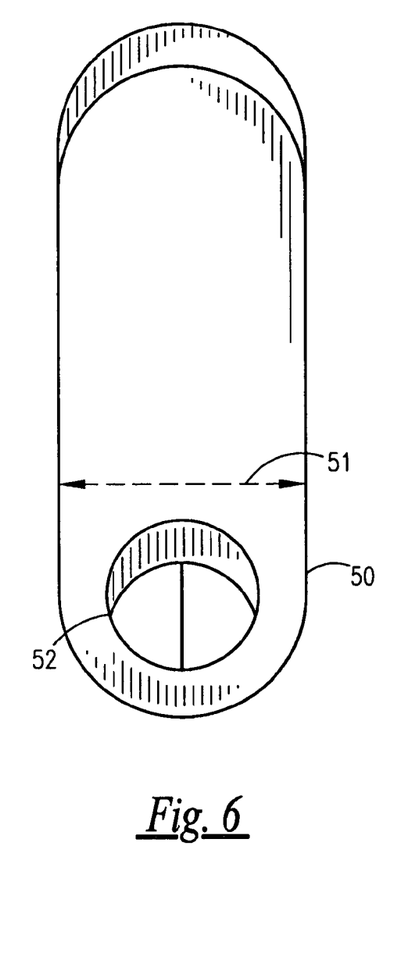
FIG. 6 is a top plan view of the trimmer housing illustrating the cutting guide indicator, according to the preferred embodiment of the present invention.

Thus, upon actuation of motor 80 and 90 via on/off switch 22, and after depression of first actuation switch 23 which causes rotation of first linehead assembly 100, user depresses second actuation switch 24 to cause rotation of second linehead assembly 150, thereby facilitating simultaneous rotation by first and second linehead assembly 100, 150, and in turn, facilitating the trimming of grass at both a substantially horizontal and vertical plane. A cutting guide indicator 51 is disposed atop trimmer housing 50 to provide user with a visual guide of a prospective vertical cutting line.

In the event user desires to employ the use of either linehead assembly 100, 150 independently, user simply refrains from depressing the corresponding actuation switch 23, 24. Upon completion of a trimming task, user depresses the on/off switch 22, thereby de-energizing motor 80 and 90.

Figure 7:
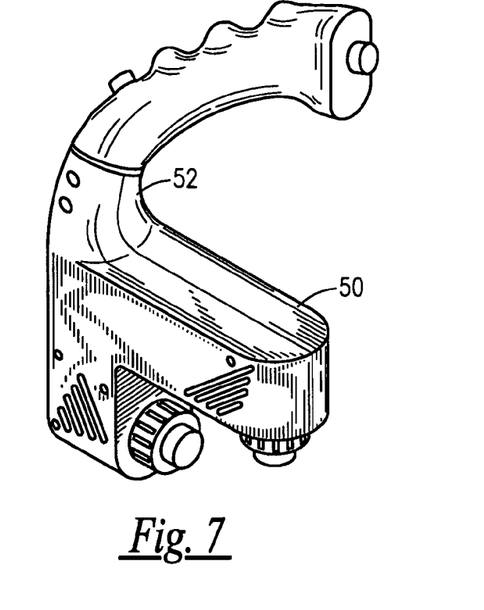
FIG. 7 is a side elevational view of the present invention shown with a shortened handle.
Figure 8:
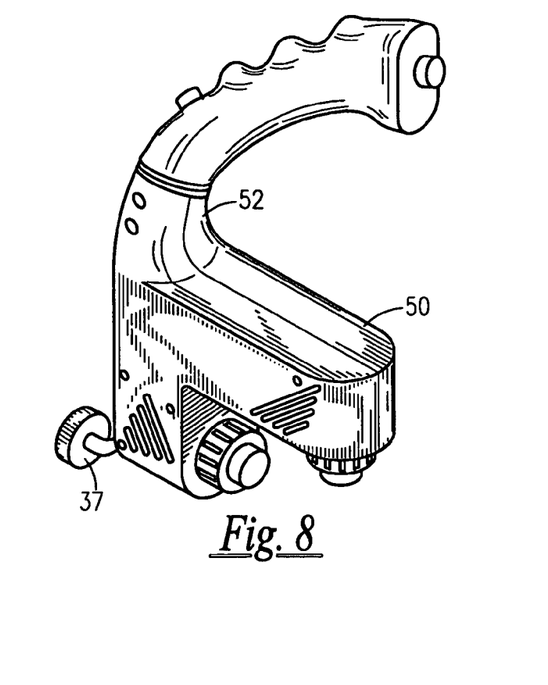
FIG. 8 is a side elevational view of the present invention shown with a shortened handle and buoyant wheels.

It is envisioned that the device 10 is made available with a shorter handle 20a, as illustrated in FIG. 7. It is further envisioned that device 10 is adapted with buoyant wheels 37 to provide user with a choice of depth when trimming, as shown in FIG. 8.

Referring now to FIGS. 9–15, an alternate embodiment of the present invention is provided which comprises a grass trimming device adapted with dual, pivotal linehead spool hubs 200. The grass trimming device with dual, pivotal linehead spool hubs 200, hereinafter device 200, comprises a pair of rotatable motor support housings 210 and 230. Rotatable motor support housing 210 is mounted transversely atop a bottom wall formed by formed by two halves 50a, 50b of trimmer housing 50 at the anterior portion 57 thereof, wherein mounting orientation is depicted by axis A.

Figure 9:
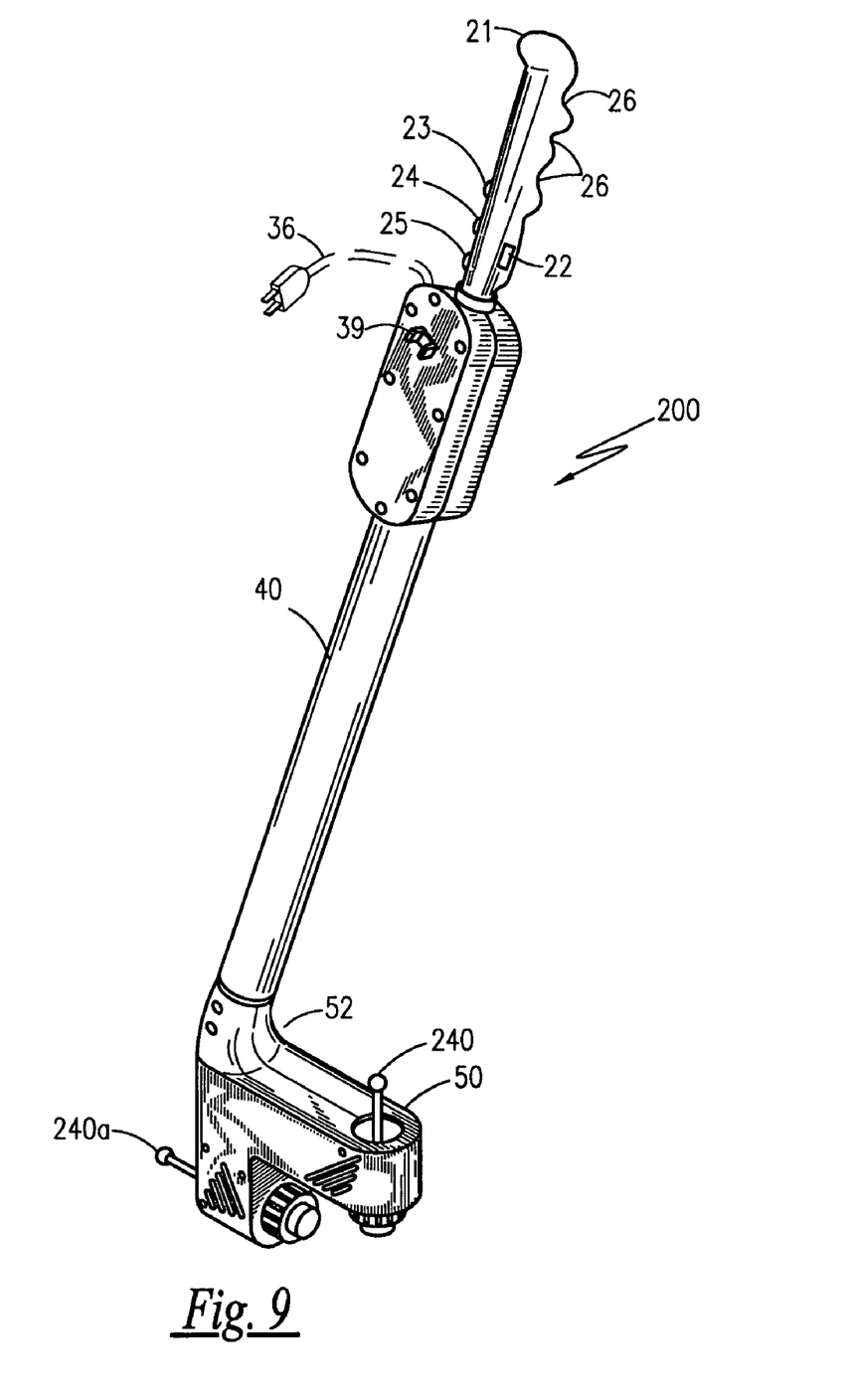
FIG. 9 is a perspective view of an alternate embodiment of the present invention.
Figure 10:
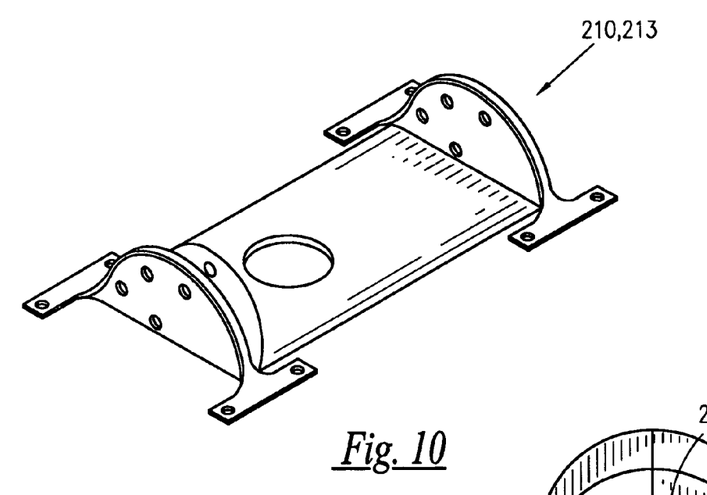
FIG. 10 is a perspective view of the rotatable motor support housing.

Rotatable motor support housing 230 is mounted transversely atop a vertically-extending, inner bottom wall of the two halves 50a, 50b of trimmer housing 50 at the posterior portion 59 thereof, wherein mounting orientation is depicted by axis B. Because rotatable motor support housing 210 and 230 are designed and configured essentially identical, only rotatable motor support housing 210 will be described.

Figure 12:
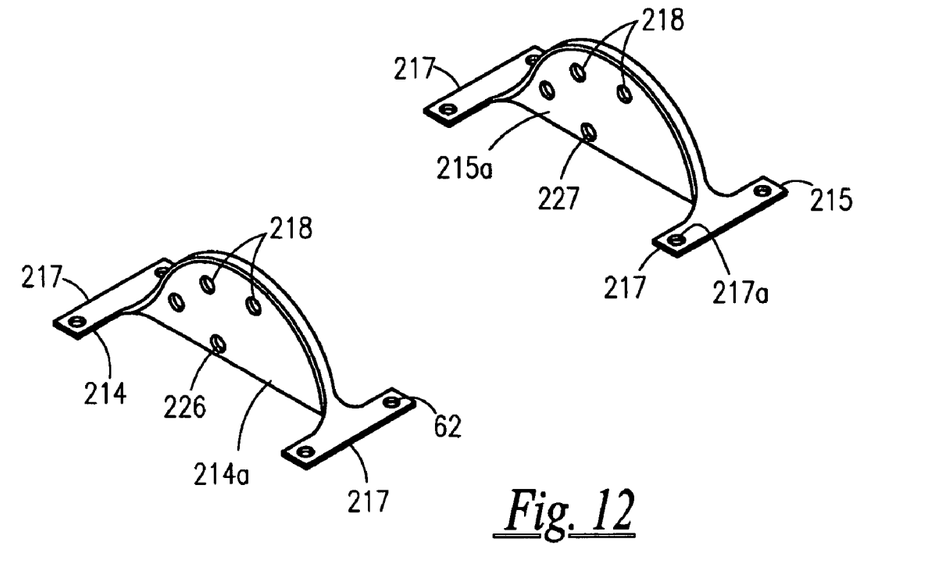
FIG. 12 is a perspective view of a pair of arcuate index brackets.

The rotatable motor support housing 210 defines a pair of arcuate index brackets 214, 215, each having an index plate 214a, 215a, respectfully, defining an arcuate shape, and a pair of opposed flanges 217 integrally molded along each end of index plate 214a, 215b. The flanges 217 include apertures 217a through which a coupling means 62 is inserted for mounting the arcuate index brackets 214, 215 to the bottom wall of halves 50a, 50b.

Each index plate 214a, 215a includes a series of annularly-oriented holes 218 adapted to receive a spring-biased lug 228a, 228b, respectfully, therethrough.

Figure 13:
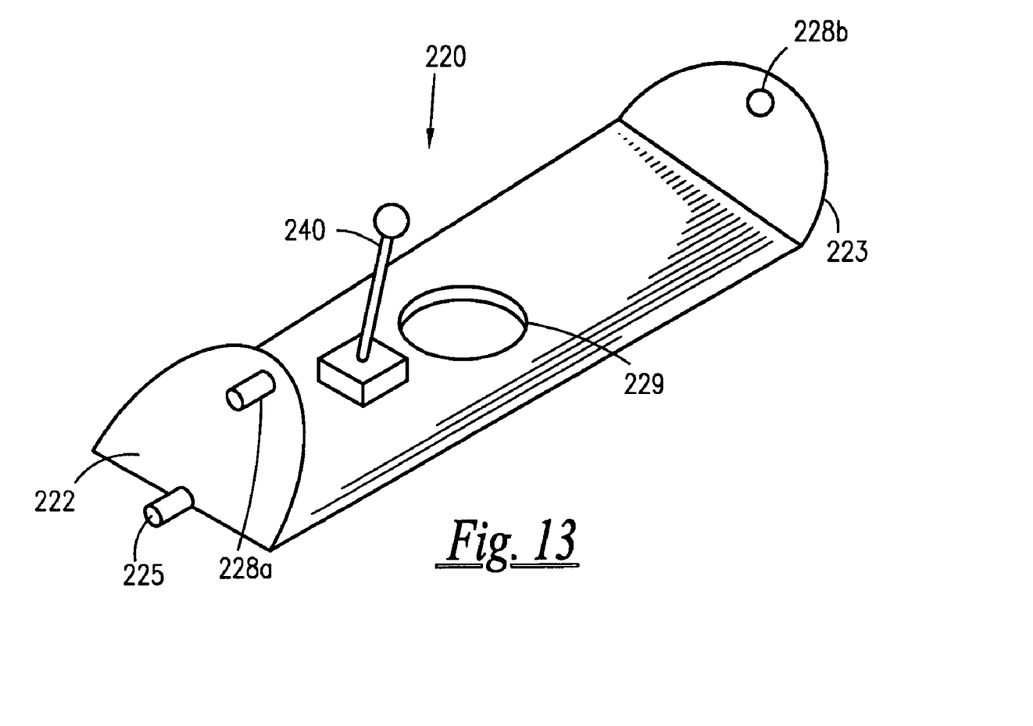
FIG. 13 is a perspective view of a rotatable motor support platform.

Rotatable motor support housing 210 includes a rotatable motor support platform 220 having a generally elongated rectangular configuration and a vertically-extending arcuate index engagement plate 222, 223 integrally molded at opposed ends thereof. A pivot pin 225 projects outwardly from a lower, central portion of each index engagement plate 222, 223, wherein each pivot pin 225 is rotatably held within a bore 226, 227 formed in each index plate 214a, 215a, respectfully, thereby allowing motor support platform 220 to rotate about the arcuate index brackets 215, 215 via pivot pin 225.

In order to lock the motor support platform 220 at a desired indexed position, each index engagement plate 222, 223 is provided with spring-biased lug 228a, 228b, projecting outwardly from an upper middle portion thereof. Each spring-biased lug 228a, 228b is biased outwardly in a resting position. The spring-biased lug 228a, 228b is adapted to mate or latch within a selected angularly-oriented hole 218 of index plate 214a, 215a, thereby keeping the motor support platform 220 and arcuate index brackets 214, 215 locked together at a selected rotationally-indexed position.

Figure 11:
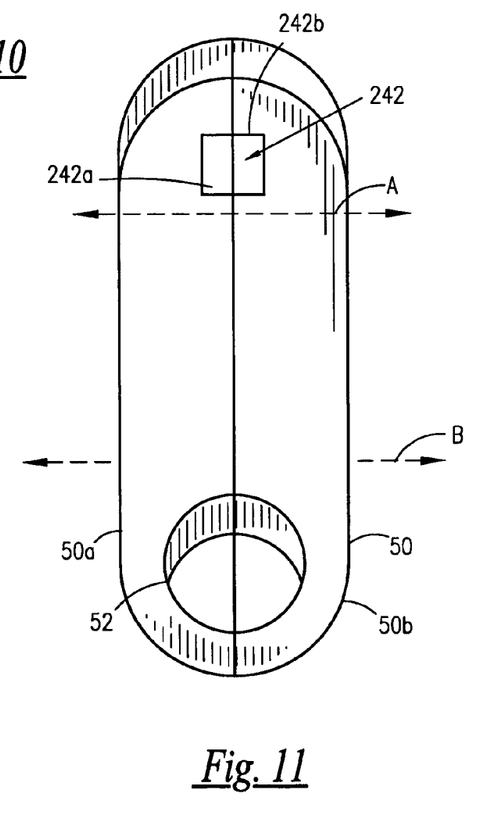
FIG. 11 is a top plan view of the trimmer housing illustrating the elongated void for accommodating a control handle.
Figure 14:
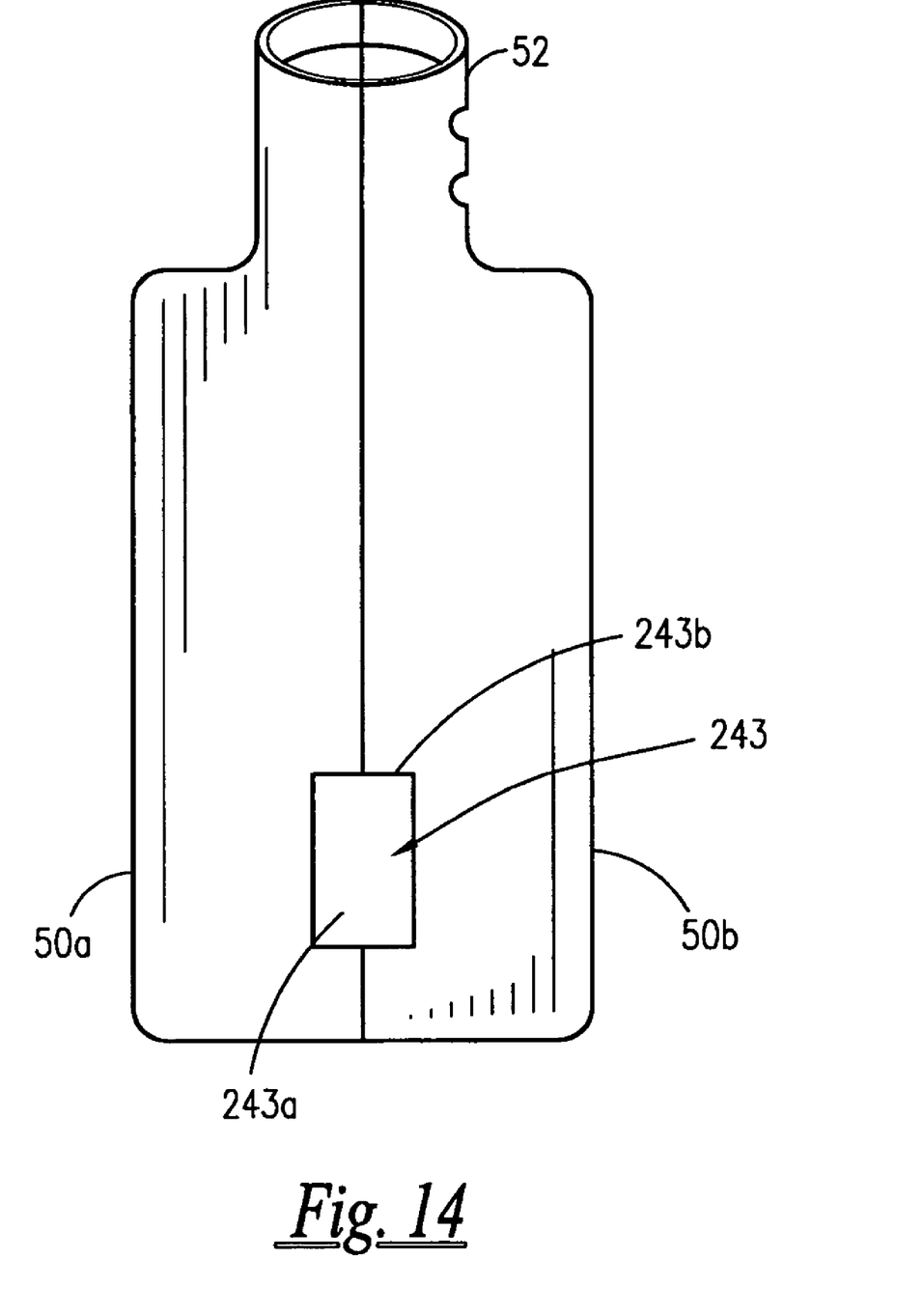
FIG. 14 is a rear side elevational view of the trimmer housing illustrating the elongated void for accommodating a second control handle.

Manual rotation of motor support platform 220 is consummated via a control handle 240. A lower end of control handle 240 is mounted vertically atop motor support platform 220. An upper end of control handle 240 extends upwardly through an elongated oval void 242 formed from a pair of semi-rectangular recesses 242a, 242b formed along top wall of halves 50a, 50b at anterior portion 57 of trimmer housing 50. An upper end of a second control handle 240a extends upwardly through an elongated void 243 formed from a pair of semi-rectangular recesses 243a, 243b formed along a rear wall of halves 50a, 50b at posterior portion 59 of trimmer housing. Thus, the elongated oval void 242 is formed when halves 50a, 50b are coupled together.

Figure 15:
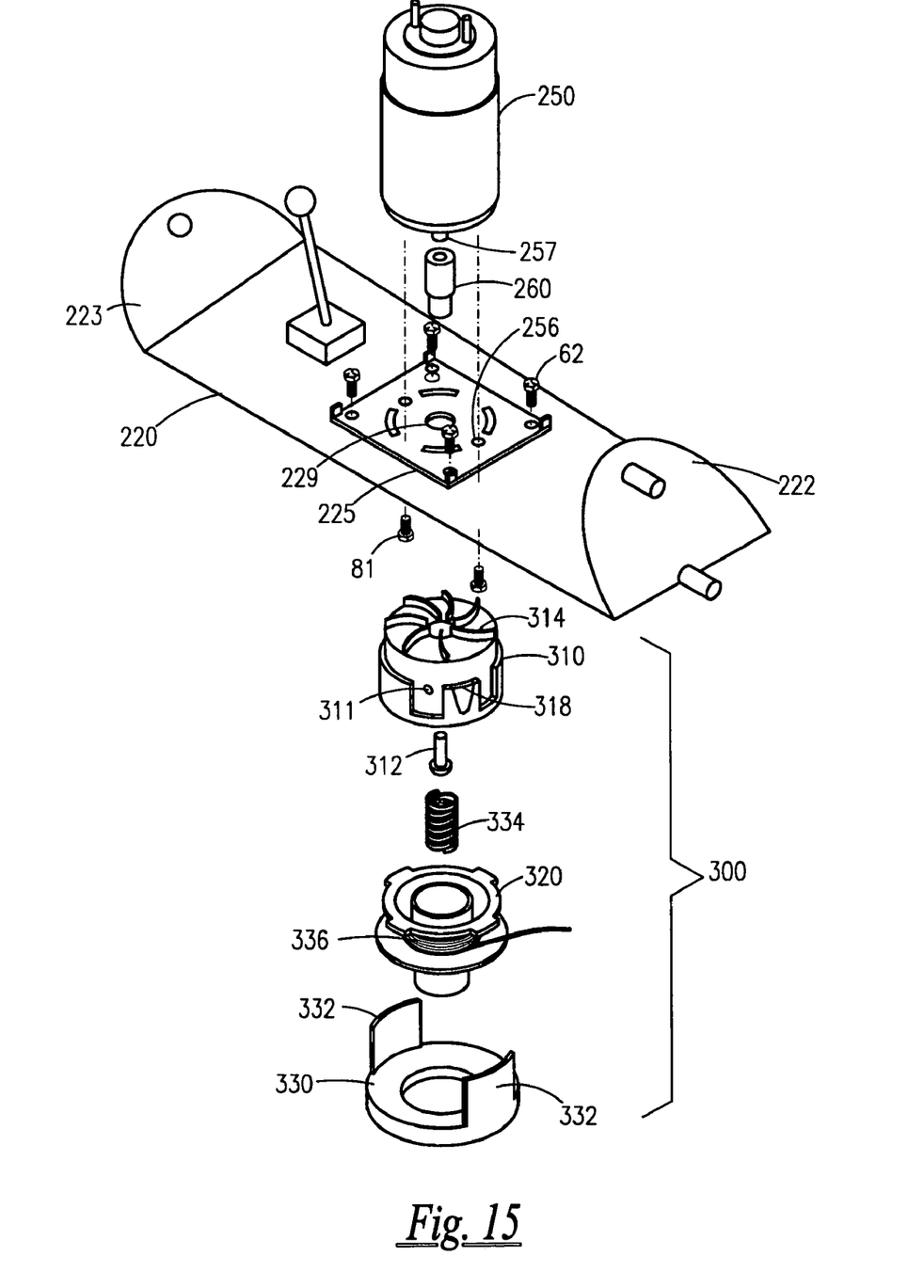
FIG. 15 is an exploded perspective view of the motor, the mounting plate, the rotatable motor support platform, and linehead assembly.

Referring more specifically to FIG. 15, the motor support platform 220 includes a circular opening 229 overwhich motor mounting plate 255 is mounted via a coupling means 62. A motor 250 is mounted atop motor mounting plate 255 via bolts 81 driven through apertures 256 formed within motor mounting plate 255. The motor 250 includes a motor shaft 257 which extends through circular opening 229. An upper end of a linehead housing coupler 260 is mounted to a lower end of motor shaft 257.

A linehead assembly 300 is provided and comprises a linehead housing 310 being positioned at a lower end of linehead housing coupler 260 in an overlying manner, to which linehead housing 310 is secured via a fastener 312. A top side of linehead housing 310 is provided with integrally molded fan blades 314 to facilitate cooling of motor 250. The linehead housing 310 is adapted to house a linehead spool 320 which is held in place between tabs 332 of a linehead cover 330. The tabs 332 project upwardly along an outer periphery of linehead cover 330, at opposed positions there along. The tabs 332 are adapted to engage opposed slots 318 formed in linehead housing 310, thereby fastening linehead cover 330 thereto.

In order to bias the linehead spool 320 against the linehead cover 330, a helical spring 334 is vertically positioned between the linehead spool 320 and the linehead housing 310. Consequently, linehead housing 310, linehead spool 320, helical spring 334, linehead cover 330, and fastener 312 comprise the linehead assembly 300.

Trimming line 336 is wound about the linehead spool 320, wherein a free end thereof is inserted through a hole 311 formed in a vertical sidewall of linehead housing 310 and extended outward therefrom.

Device 200, in all other respects, is identical to and incorporates remaining elements and components as described hereinabove regarding the preferred embodiment.

2. Operation of the Preferred Embodiment

To use the present invention, user engages the on/off switch 22 is adapted to energize motors 80 and 90. User next engages the first actuation switch 23 to activate operation of the first linehead assembly 100, and engages the second actuation switch 24 to activate operation of the second linehead assembly 150. Next, user employs the present invention to trim grass and weeds. User may engage the safety lock switch 25 in order to simultaneously disenable both the first linehead assembly 100 and the second linehead assembly 150. In the event user desires to employ the use of either linehead assembly 100, 150 independently, user simply refrains from depressing the corresponding actuation switch 23, 24. Upon completion of a trimming task, user depresses the on/off switch 22, thereby de-energizing motor 80 and 90.

The use of the present invention allows for outgrowth vegetation to be trimmed at both a substantially horizontal and vertical plane in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Therefore, the scope of the invention is to be broadly limited only by the following Claims.

What is claimed is:

1. A grass trimming device comprising:
    a handle, said handle retains an on/off switch, a first actuation switch, a second actuation switch, and a safety lock switch;
    a battery housing, said battery housing is fastened via fasteners at an upper end of said battery housing to a lower end of said handle, wherein said battery housing is formed of two halves being coupled together via a coupling means, said two halves define a battery retainer integrally formed within said two halves in order to secure a battery in position;
    a shaft, said shaft is of an elongated, rigid configuration, said shaft has an upper end fastened to a lower end of said battery housing via fasteners;
    a trimmer housing, said trimmer housing has an upper, rearward end mounted to a lower end of said shaft at a tubular neck portion of said trimmer housing, said trimmer housing has an anterior portion opposing a posterior portion;
    a first motor, said first motor is housed within said trimmer housing;
    a first linehead assembly, said first linehead assembly is secured to said first motor;
    a second motor, said second motor is housed within said trimmer housing; and
    a second linehead assembly, said second linehead assembly is secured to said second motor.

2. The grass trimming device of claim 1 wherein said on/off switch, said first actuation switch, said second actuation switch, said safety lock switch, said battery, said first motor, and said second motor are electrically connected via connecting wires.

3. The grass trimming device of claim 1, wherein said first linehead assembly comprises a linehead housing, a linehead spool, a helical spring, a linehead cover, and a fastener.

4. The grass trimming device of claim 3, wherein said linehead housing is positioned at a lower end of said linehead housing coupler of said first motor in an overlying manner, to which said linehead housing is secured via said fastener, said linehead housing has a top side provided with integrally molded fan blades to facilitate cooling of said first motor, said linehead housing is adapted to house said linehead spool which is held in place between tabs of said linehead cover, wherein said tabs project upwardly along an outer periphery of said linehead cover, at opposed positions there along, said tabs are adapted to engage opposed slots formed in said linehead housing, thereby fastening said linehead cover thereto.

5. The grass trimming device of claim 3, wherein said helical spring is vertically positioned between said linehead spool and said linehead housing in order to bias said linehead spool against said linehead cover.

6. The grass trimming device of claim 3, wherein said linehead spool includes trimming line being wound thereabout, said trimming line has a free end inserted through a hole formed in a vertical sidewall of said linehead housing and extended outward therefrom.

7. The grass trimming device of claim 1, wherein said on/off switch is adapted to energize and de-energize said first motor and said second motor, said first actuation switch activates operation of said first linehead assembly, and said second actuation switch activates operation of said second linehead assembly, said safety lock switch functions to simultaneously disenable both said first linehead assembly and said second linehead assembly, whereupon actuation of said first motor via said on/off switch, and after depression of said first actuation switch, said first linehead assembly rotates, thereby causing said trimming line to rotate about an axis of said linehead spool in a substantially horizontal plane.

8. The grass trimming device of claim 1, wherein said wherein said second linehead assembly comprises a linehead housing, a linehead spool, a helical spring, a linehead cover, and a fastener.

9. The grass trimming device of claim 8, wherein said second linehead assembly is designed, connected, and configured with substantially identical components as said first linehead assembly, and thus functions identically, except for a vertical cutting orientation provided by said second linehead assembly.

10. The grass trimming device of claim 7, wherein said on/off switch energizes said first motor and said second motor, said first actuation switch is depressed causing rotation of said first linehead assembly, said second actuation switch is depressed causing rotation of said second linehead assembly, thereby facilitating simultaneous rotation by first linehead assembly and said second linehead assembly, and in turn, facilitating a trimming of grass at both a substantially horizontal and vertical plane.

11. The grass trimming device of claim 1, wherein said trimmer housing includes a cutting guide indicator disposed thereatop to provide user with a visual guide of a prospective vertical cutting line.

12. A grass trimming device comprising:
a handle, said handle retains an on/off switch, a first actuation switch, a second actuation switch, and a safety lock switch;
a battery housing, said battery housing is fastened via fasteners at an upper end of said battery housing to a lower end of said handle;
a shaft, said shaft is of an elongated, rigid configuration, said shaft has an upper end fastened to a lower end of said battery housing via fasteners;
a trimmer housing, said trimmer housing has an upper, rearward end mounted to a lower end of said shaft at a tubular neck portion of said trimmer housing, said trimmer housing has an anterior portion opposing a posterior portion and is formed of two halves being coupled together via a coupling means, said two halves define a first retainer integrally formed within said two halves for securing a first motor mounting plate in position, said first retainer resides within said anterior portion of said trimmer housing and further lies in a horizontal orientation, said two halves of said trimmer housing are each provided with foramens to facilitate cooling of said first motor and said second motor, and wherein said two halves define a second retainer integrally formed within said two halves for securing a second motor mounting plate in position, said second retainer resides within said posterior portion of said trimmer housing and further lies in a vertical orientation;
a first motor, said first motor is housed within said trimmer housing;
a first linehead assembly, said first linehead assembly is secured to said first motor;
a second motor, said second motor is housed within said trimmer housing; and
a second linehead assembly, said second linehead assembly is secured to said second motor.

13. The grass trimming device of claim 12, wherein said first motor mounting plate includes a plurality of apertures formed therethrough to facilitate securable mounting of said first motor to said first motor mounting plate, said first motor mounting plate includes a central portal, said first motor is mounted atop said first motor mounting plate via bolts, and said first motor mounting plate is coupled to said first retainer via a coupling means, said first motor includes a motor shaft which extends through said central portal of said first motor mounting plate, and wherein said motor shaft has a lower end mounted to an upper end of a linehead housing coupler.

14. The grass trimming device of claim 12, wherein said second motor mounting plate includes a plurality of apertures formed therethrough to facilitate securable mounting of said second motor to said second motor mounting plate, said second motor mounting plate includes a central portal, said second motor is mounted atop said second motor mounting plate via bolts, said second motor is positioned perpendicular with respect to said first motor, said second motor mounting plate is coupled to second retainer via a coupling means, said second motor includes a motor shaft which extends through said central portal of said second motor mounting plate, and wherein said motor shaft has a lower end mounted to an upper end of a linehead housing coupler.

15. A grass trimming device comprising:
a handle, said handle retains an on/off switch, a first actuation switch, a second actuation switch, and a safety lock switch;
a battery housing, said battery housing is fastened via fasteners at an upper end of said battery housing to a lower end of said handle;
a shaft, said shaft is of an elongated, rigid configuration, said shaft has an upper end fastened to a lower end of said battery housing via fasteners;
a trimmer housing, said trimmer housing has an upper, rearward end mounted to a lower end of said shaft at a tubular neck portion of said trimmer housing, said trimmer housing has an anterior portion opposing a posterior portion, said trimmer housing is formed of two halves being coupled together via a coupling means;
a first motor, said first motor is housed within said trimmer housing;
a second motor, said second motor is housed within said trimmer housing; and
a pair of rotatable motor support housings, said pair of rotatable motor support housings is adapted to support said first motor and said second motor, and wherein said pair of rotatable motor support housings are adapted to facilitate simultaneous rotation by a first linehead assembly and a second linehead assembly;
wherein said pair of rotatable motor support housings defines a first rotatable motor support housing and a second rotatable motor support housing, said first rotatable motor support housing is mounted transversely atop a bottom wall formed by formed by said two halves of said trimmer housing at said anterior portion thereof, said second rotatable motor support housing is mounted transversely atop a vertically-extending, inner bottom wall of said two halves of said trimmer housing at said posterior portion thereof.

16. The grass trimming device of claim 15, wherein each of said pair of rotatable motor support housings defines a pair of arcuate index brackets, wherein each of said pair of arcuate index brackets has an index plate defining an arcuate shape and a pair of opposed flanges integrally molded along each end of said index plate, said pair of opposed flanges include apertures through which a coupling means is inserted for mounting said pair of arcuate index brackets to a bottom wall of said two halves, and wherein each said index plate includes a series of annularly-oriented holes adapted to receive a spring-biased lug therethrough, and wherein each of said pair of rotatable motor support housings further includes a rotatable motor support platform having a generally elongated rectangular configuration and a vertically-extending arcuate index engagement plate integrally molded at opposed ends of said rotatable motor support platform, wherein each said index engagement plate includes a pivot pin projecting outwardly from a lower, central portion thereof, wherein each said pivot pin is rotatably held within a bore formed in each said index plate of said pair of arcuate index brackets, thereby allowing said rotatable motor support platform to rotate about said arcuate index brackets via said pivot pin, and wherein each said index plate of said pair of arcuate index brackets is provided with a spring-biased lug projecting outwardly from an upper middle portion of each said index plate in order to lock said rotatable motor support platform at a desired indexed position, said spring-biased lug is biased outwardly in a resting position, and wherein said spring-biased lug is adapted to mate or latch within a selected angularly-oriented hole of each said index plate, thereby keeping said rotatable motor support platform and said pair of arcuate index brackets locked together at a selected rotationally-indexed position, and wherein said rotatable motor support platform includes a circular opening overwhich a motor mounting plate is mounted via a coupling means, wherein each said motor mounting plate is mounted with a respective said first motor and said second motor thereatop via bolts, said bolts are driven through apertures formed within said motor mounting plate, and wherein each of said first motor and said second motor includes a motor shaft which extends through said circular opening of said rotatable motor support platform, said motor shaft has a lower end mounted to an upper end of a linehead housing coupler.

17. The grass trimming device of claim 15, wherein said first linehead assembly and said second linehead assembly each comprise a linehead housing positioned at a lower end of a linehead housing coupler in an overlying manner, to which linehead housing is secured via fasteners, said linehead housing has a top side provided with integrally molded fan blades to facilitate cooling of said first motor and said second motor, said linehead housing is adapted to house a linehead spool, said linehead spool is held in place between tabs of a linehead cover, said tabs project upwardly along an outer periphery of said linehead cover, at opposed positions there along, said tabs are adapted to engage opposed slots formed in said linehead housing, thereby fastening said linehead cover to said linehead housing, said linehead spool is biased against said linehead cover via a helical spring, said helical spring is vertically positioned between said linehead spool and said linehead housing, said linehead spool includes trimming line being wound thereabout, said trimming line has a free end inserted through a hole formed in a vertical sidewall of said linehead housing and extended outward therefrom.

18. The grass trimming device of claim 16, wherein said rotatable motor support platform includes a first control handle having a lower end mounted vertically atop said rotatable motor support platform at said anterior portion of said trimmer housing, wherein said first control handle facilitates manual rotation of said rotatable motor support platform at said anterior portion of said trimmer housing, said first control handle has an upper end which extends upwardly through an elongated oval void formed from a pair of semi-rectangular recesses formed along a top wall of said two halves at said anterior portion of said trimmer housing, and wherein said rotatable motor support platform includes a second control handle having a lower end mounted vertically atop said rotatable motor support platform at said posterior portion of said trimmer housing, said second control handle has an upper end which extends upwardly through an elongated void formed from a pair of semi-rectangular recesses formed along a rear wall of said two halves at said posterior portion of said trimmer housing, said second control handle facilitates manual rotation of said rotatable motor support platform at said posterior portion of said trimmer housing.

\* \* \* \* \*